United States Patent [19]
Matsui et al.

[11] Patent Number: 4,900,911
[45] Date of Patent: * Feb. 13, 1990

[54] FOCUS DETECTING SYSTEM UTILIZING CORRECTION DATA ON ABERRATIONS OF THE PHOTOGRAPHIC LENS

[75] Inventors: Toru Matsui; Toshihiko Karasaki, both of Sakai, Japan

[73] Assignee: Minolta Camera Kabushiki Kaisha, Osaka, Japan

[*] Notice: The portion of the term of this patent subsequent to Apr. 4, 2006 has been disclaimed.

[21] Appl. No.: 307,903

[22] Filed: Feb. 7, 1989

Related U.S. Application Data

[63] Continuation of Ser. No. 24,346, Mar. 10, 1987, Pat. No. 4,818,865.

[30] Foreign Application Priority Data

Mar. 12, 1986 [JP] Japan .................. 61-52727

[51] Int. Cl.$^4$ ............ G03B 3/00; G02B 7/11
[52] U.S. Cl. .................. 250/201; 250/204; 354/403; 354/406; 354/408
[58] Field of Search ...... 250/201 R, 201 AF, 201 PF, 250/204; 354/402, 403, 404, 406, 407, 408

[56] References Cited

U.S. PATENT DOCUMENTS

| 4,333,007 | 6/1982 | Langlais et al. | 250/201 |
| 4,341,953 | 7/1982 | Sakai et al. | 250/201 |
| 4,373,791 | 2/1983 | Araki | 250/201 |
| 4,473,287 | 9/1984 | Fukuhara et al. | 354/402 |
| 4,511,232 | 4/1985 | Yamada | 354/403 |
| 4,518,242 | 5/1985 | Toyama | 354/403 |
| 4,562,346 | 12/1983 | Hayashi et al. | 250/201 |
| 4,571,047 | 2/1986 | Hirai | 354/403 |
| 4,591,919 | 5/1986 | Kaneda et al. | 250/201 |
| 4,602,861 | 7/1986 | Taniguchi et al. | 354/403 |
| 4,636,624 | 1/1987 | Ishida et al. | 250/201 |
| 4,636,627 | 1/1987 | Matsumura | 250/201 |
| 4,743,932 | 5/1988 | Matsui | 354/403 |
| 4,818,865 | 4/1989 | Matsui et al. | 250/201 |

FOREIGN PATENT DOCUMENTS 46-37957 11/1971 Japan .
55-111924 8/1980 Japan .
57-22210 2/1982 Japan .
59-206807 11/1984 Japan .
59-208514 11/1984 Japan .

Primary Examiner—Edward P. Westin
Attorney, Agent, or Firm—Price, Gess & Ubell

[57] ABSTRACT

A focus detecting system having a passive type automatic focusing function and an active type automatic focusing function. When the passive type automatic focusing function is used, focus detection is performed using light which is incident from a position close to an optical axis of a photographic lens, while in the case of using the active type automatic focusing function, focus detection is performed using light which has passed through a position far from the optical axis of a photographic lens. The focus detection value is corrected using a preset correction value to set the photographic lens in the best image position.

12 Claims, 14 Drawing Sheets

FIG. 3(a)
FIG. 3(b)
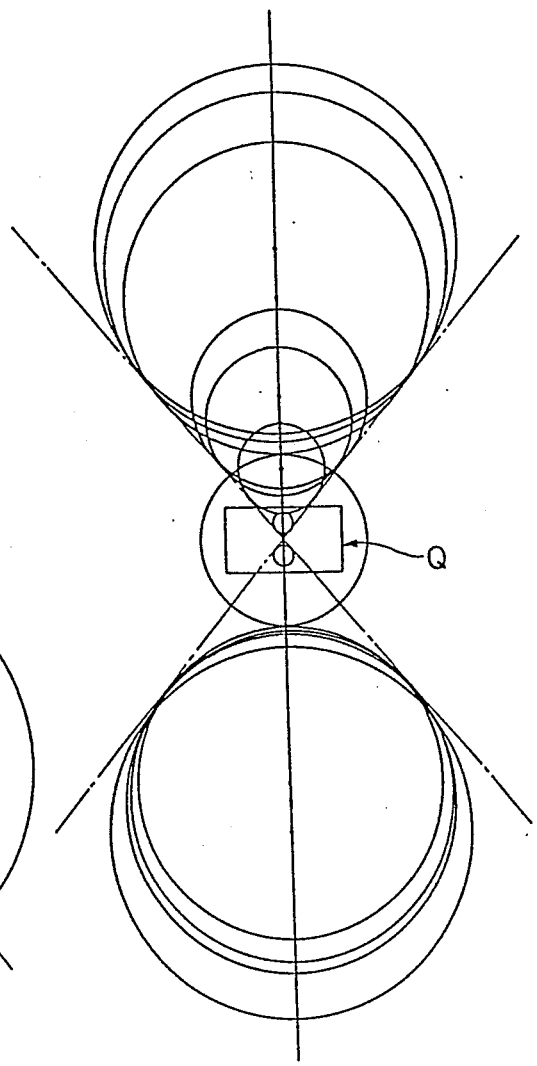
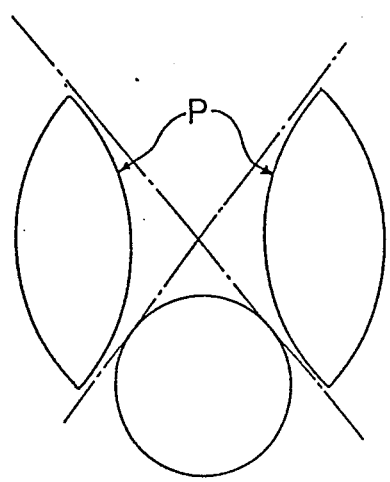

FIG. 4

| FOCUSING CONDITION | f/F_NO | 50/1.7 | 35-105/3.5-4.5(L) | 35-105/3.5-4.5(S) |
|---|---|---|---|---|
| INFINITE DISTANCE POSITION | | | | |
| CLOSEST DISTANCE POSITION | | | | |

|  | AF SENSOR MODULE | |
|---|---|---|
|  | AF SENSOR ($F_{NO.}$ LARGE) | AF SENSOR ($F_{NO.}$ SMALL) |
| PASSIVE AF | $\Delta SB_1$ | ($\Delta SB_2$) |
| TTL ACTIVE AF | ($\Delta SB_1 + \Delta IR_1$) | $\Delta SB_2 + \Delta IR_2$ |

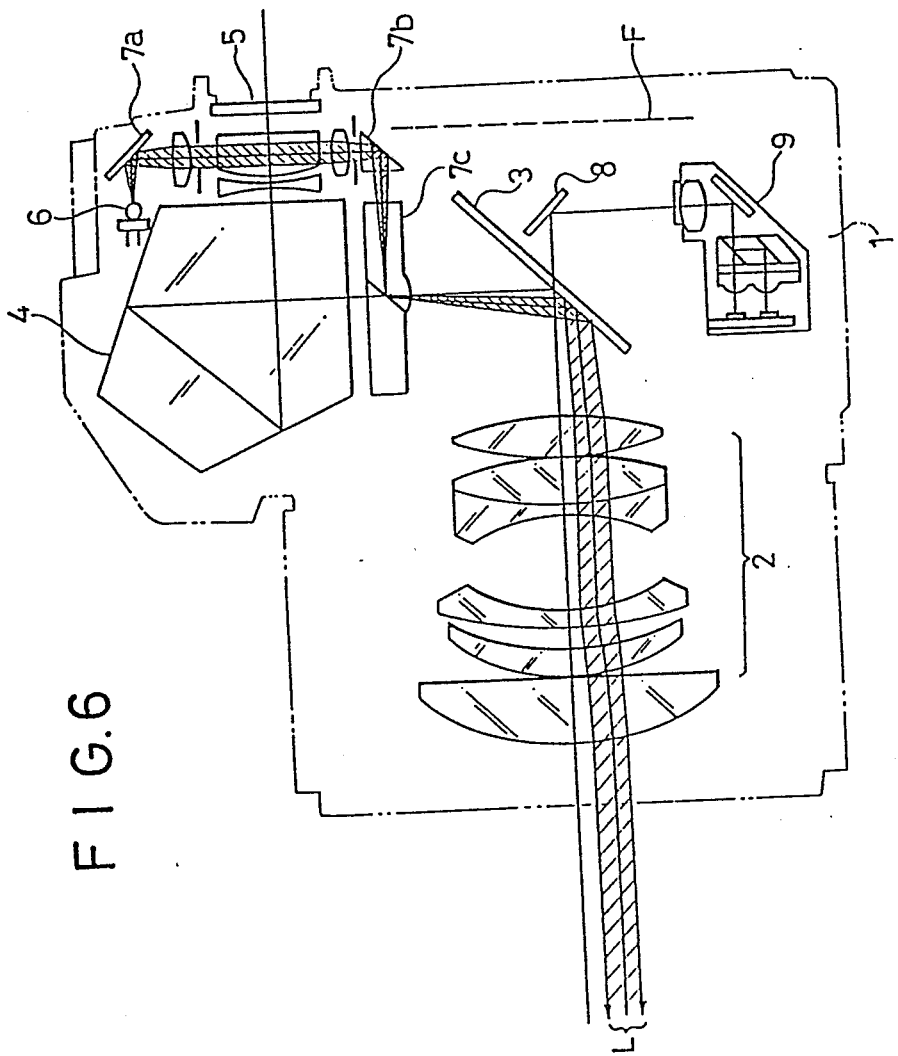

F I G. 7(a)
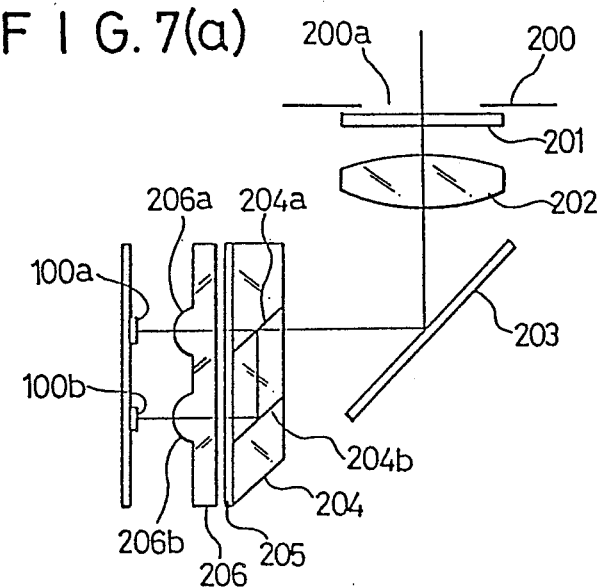
F I G. 7(b)
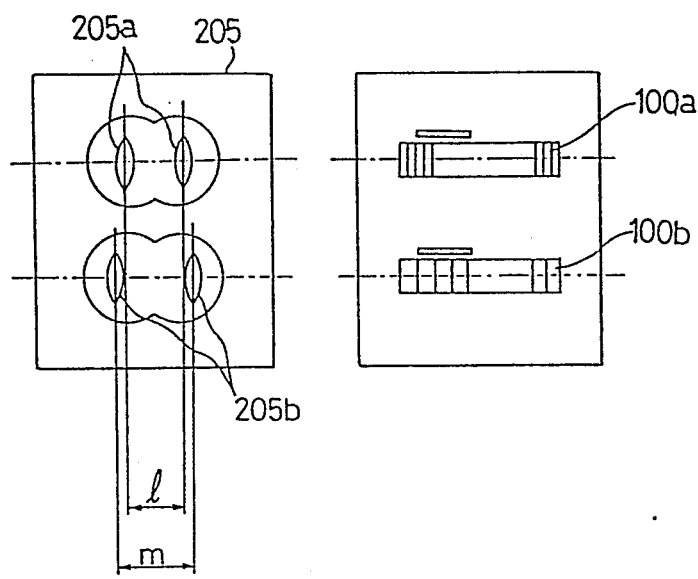

|  | AF SENSOR MODULE | |
|---|---|---|
|  | AF SENSOR ($F_{NO.}$ LARGE) | AF SENSOR ($F_{NO.}$ SMALL) |
| PASSIVE AF  Ca | $Ca_1 = \Delta SB_1$ | $Ca_2 = \Delta SB_2$ |
| EXTERNAL LIGHT TYPE ACTIVE AF  Cc | $Cc_1 = \Delta SB_1 + \Delta IR_1$ | $Cc_2 = \Delta SB_2 + \Delta IR_2$ |
| TTL ACTIVE AF  Cd | $Cd_1 = (\Delta SB_1 + \Delta IR'_1)$ | $Cd_2 = (\Delta SB_2 + \Delta IR'_2)$ |

FIG. 12

| | AF SENSOR MODULE ||
| | AF SENSOR ($F_{NO}$. LARGE) | AF SENSOR ($F_{NO}$. SMALL) |
|---|---|---|
| PASSIVE AF | $\Delta SB_1$ | |
| EXTERNAL LIGHT TYPE ACTIVE AF | $\Delta SB_1 + \Delta IR_1$ | |
| TTL ACTIVE AF | | $\Delta SB_2 + \Delta IR_2'$ ($\Delta SB_1 + \Delta IR_{12}$) |

FOCUS DETECTING SYSTEM UTILIZING CORRECTION DATA ON ABERRATIONS OF THE PHOTOGRAPHIC LENS

This is a continuation of application Ser. No. 024,346, filed Mar. 10, 1987, now U.S. Pat. No. 4,818,865.

BACKGROUND OF THE INVENTION

1. Field of the Invention

The present invention relates to a passive and active type focus detecting system of a high accuracy having plural sets of apertures capable of adjusting a focus detecting position in consideration of aberration of a photographic lens mounted on a cameras body at the time of focus detection.

2. Description of the Prior Art

Focus detecting methods in automatic focus detecting systems for camera are classified into a passive type focus detecting method (hereinafter referred to as "passive AF") in which focus detection is performed using an external light, and an active type focus detecting method (hereinafter referred to as "active AF") in which a focus detecting infrared light is directed to an object from the camera side and the reflected light is detected for focus detection. The latter, i.e., the active AF, includes a TTL active type focus detecting method (hereinafter referred to as the "TTL active AF") in which a light source is incorporated in a camera, light from the light source directed to an object through a photographic lens, and the reflected light is conducted to a light sensing element again through the photographic lens and is detected.

In the TTL active AF it is necessary to take measures to prevent radiated light from being reflected between surfaces of constituent lens elements of a photographic lens and becoming incident as a disturbing light on the light sensing element. In an interchangeable lens type camera system, there are provided a variety of interchangeable lenses having different focal lengths and open aperture values, so the focus detecting system used therein is also required to permit the use of those many kinds of interchangeable lenses.

To satisfy the requirement just mentioned above it is necessary to adopt a construction in which a light sensing element for focus detection is disposed so as to detect light passing through a region close to a lens optical axis and thereby permit the use of a photographic lens having a large open aperture value. However, such an arrangement permits easier influence of the aforementioned disturbing light upon the light sensing element.

As a countermeasure there has been proposed a construction (see Japanese Laid Open Patent Publication No. 57-22210) in which an optical axis of a projection optical system and that of a light sensing optical system for focus detection are disposed so as not to be in point symmetry with respect to an optical axis of a photographic lens on a main plane of the same lens. However, as long as the optical axis of the projection optical system and that of the light sensing optical system for focus detection are disposed in the vicinity of the optical axis of the photographic lens, it is very difficult to completely eliminate the influence of the foregoing disturbing light.

The following concrete description is now provided about in what manner such disturbing light is generated.

FIG. 1 shows an example of a focus detecting optical system, in which L0 and F denote a photographic lens and a predetermined focal plane, respectively, and a focus detecting optical system A0 is disposed behind the focal plane F. P and Q denote masks disposed in front of lenses. And the mark C denotes a light sensing element for focus detection, which is a CCD line sensor for example.

FIG. 2(a) and FIG. 2(b) are explanatory views showing in what manner the disturbing light is generated, in which a beam of light radiated from point 0 positioned on a predetermined focal plane on an optical axis of a photographic lens is reflected by the surfaces of each lens which constitute the photographic lens. FIG. 2(a) typically shows only once-reflected light beams reflected by surface Nos. 1, 2 and 6 of lenses and returning in the incident direction, while FIG. 2(b) shows thrice-reflected light beams reflected by surface Nos. 6, 1 and again 6 and returning in the incident direction.

FIG. 3(a) shows spreads of disturbing light beams on the plane of the first mask Q in the focus detecting optical system shown in FIG. 1, the disturbing light beams spreading in point symmetry ranges with respect to the optical axis of the photographic lens. The circles in this figure represent regions of disturbing light beams reflected by the surfaces of constituent lenses of the photographic lens. Although only once-reflected disturbing light beams are here shown, these are also the cases with thrice or more reflected light beams.

FIG. 3(b) shows spreads of disturbing light beams on the plane of the second mask P in the focus detecting optical system shown in FIG. 1, the spread being smaller by an amount restricted by the first mask Q.

FIG. 4 shows how disturbing light beams vary according to different types of photographic lenses, in which there are illustrated spreads of disturbing light beams on the plane of the second mask P in the focus detecting optical system shown in FIG. 1 like that illustrated in FIG. 3(b). In FIG. 4, the upper stage is with the photographic lens in an infinite distance position, while the lower stage is with the same lens in the closest distance position. In the transverse direction there are shown a lens having a focal distance of 50 mm and an open aperture value of 1.7 as well as two different zooming conditions L and S of a zoom lens of 35–105 mm in focal length and 3.5–4.5 in open aperture value. That the spread of disturbing light beam changes with zooming is because of a positional change of lens elements which constitute the zooming lens component. The spread of disturbing light beam also changes with a focusing condition of the photographic lens. connection with the accompanying drawings wherein one example is illustrated by way of example.

BRIEF DESCRIPTION OF THE DRAWINGS

FIG. 3(a) and FIG. 3(b) are explanatory views showing spreads of disturbing light beams on masks in the focus detecting optical system;

FIG. 4 is an explanatory view showing conditions of disturbing light beams in different types of photographic lenses;

FIG. 6 is a longitudinal sectional view showing an arrangement of an optical system of a camera as well as a light emitting element and a light sensing element both for focus detection;

FIG. 7(a) and FIG. 7(b) are diagrams showing a light sensing element module for focus detection;

FIG. 12 is a diagram showing amounts of correction for different types of AF modes.

DETAILED DESCRIPTION OF THE INVENTION

The following description is first provided about the principle of the correction of information of focus detection using correction data concerning aberration of a photographic lens affected by the size of aperture mask opening selected according to changeover between passive AF and active AF.

Figure 1:
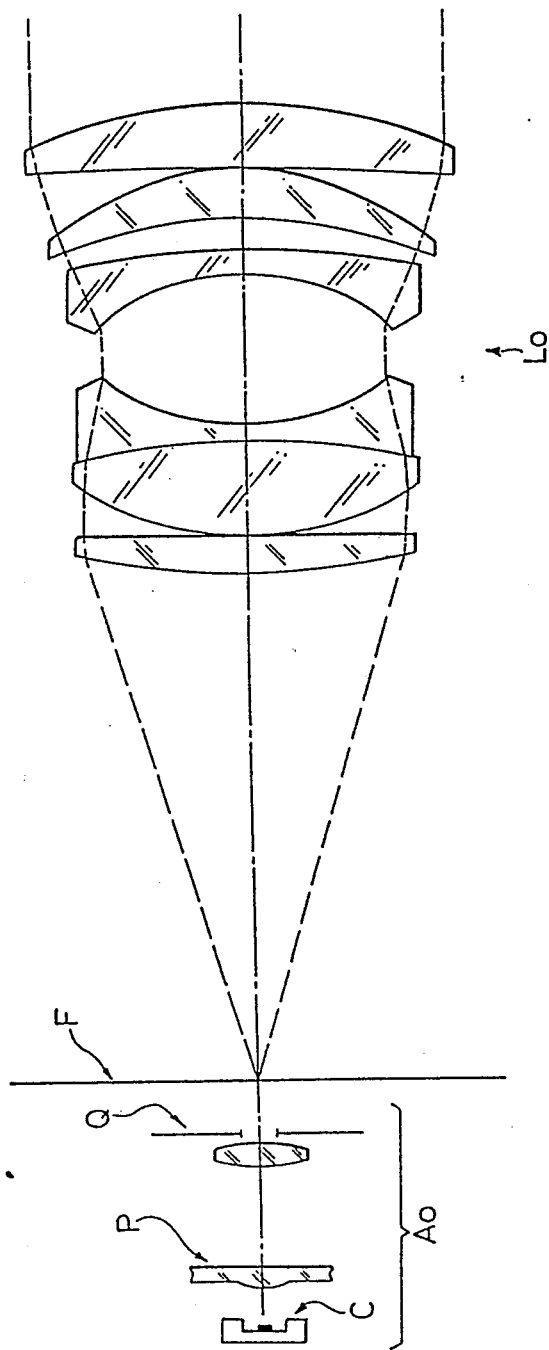
FIG. 1 is an explanatory view of a focus detecting optical system.
Figure 2A:
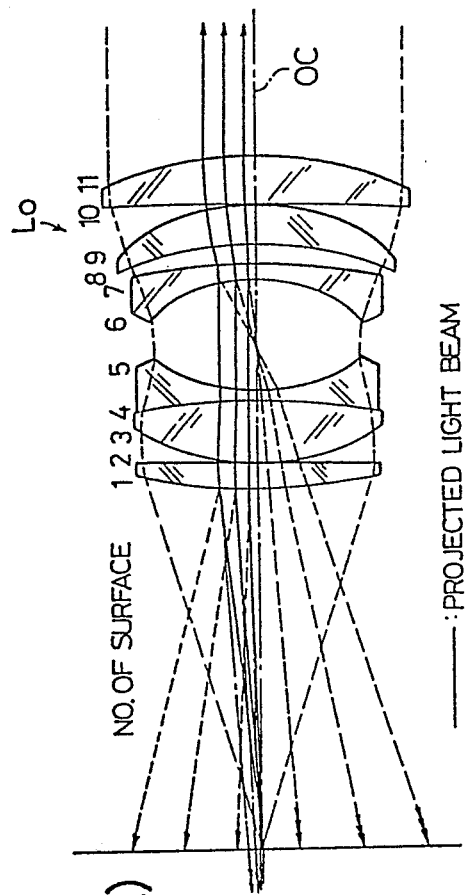
FIG. 2(a) and FIG. 2(b) are explanatory views of inter-surface reflection in a photographic lens.
Figure 2B:
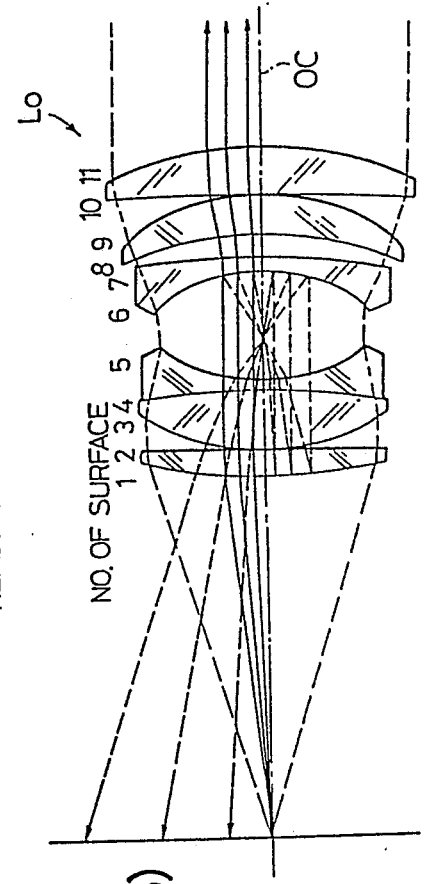
Figures 5A, 5B:
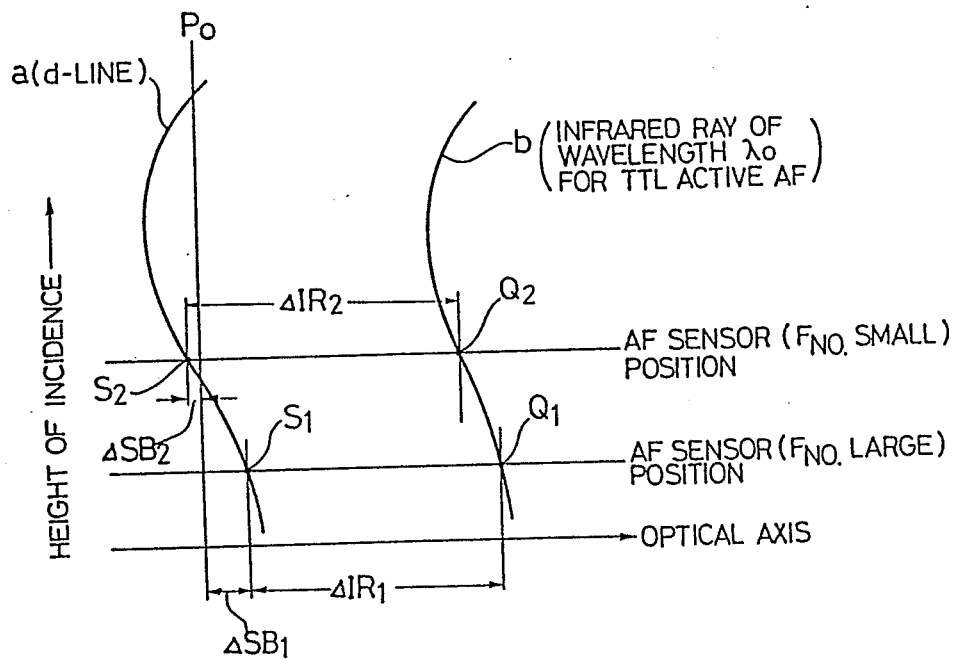
FIG. 5(a) and FIG. 5(b) are diagrams showing aberrations of a photographic lens and amounts of correction.

FIG. 5(a) shows a relation among spherical aberrations of a photographic lens against incident light beams of different wavelengths and lens stop positions set according to the result of focus detection and the best image position, in which a position along an optical axis and an incident height (F number of the photographic lens) are plotted along the axis of abscissa and the axis of ordinate, respectively.

A curve a represents a spherical aberration of the photographic lens against a visible ray of a wavelength $\lambda = 587$ mm (d-line), while a curve b represents a spherical aberration thereof against an infrared ray of a wavelength $\lambda_0$ for TTL active AF. The positions indicated as AF sensor ($F_{NO}$ large) position and AF sensor ($F_{NO}$ small) position correspond to AF sensor apertures 205a and 205b shown in FIG. 7(b) as will be later explained in detail in connection with embodiments.

$P_0$ represents the best image position on the optical axis in the case of visible ray (d-line), $S_1$ and $S_2$ represent stop positions of the photographic lens set by AF sensor ($F_{NO}$ large) and AF sensor ($F_{NO}$ small), respectively, in the case of passive AF.

Likewise, $Q_1$ and $Q_2$ represent stop positions of the photographic lens set by AF sensor ($F_{NO}$ large) and AF sensor ($F_{NO}$ small), respectively, in the case of TTL active AF.

In the case of passive AF, if the AF sensor ($F_{NO}$ large) closer to the optical axis is used and the focus detection is made by selecting the AF sensor located in this position, it follows that an accurate focusing is effected provided the difference $\Delta SB_1$ between the photographic lens stop position $S_1$ and the best image position $P_0$ is corrected.

In the case of TTL active AF, it is desirable that an incident light from a larger height of incident, namely, a portion of a smaller aperture value, of the photographic lens than in the case of passive AF be detected by the light sensing element, in order to eliminate the influence of disturbing light incident on AF sensor generated by the reflection of radiated light in the photographic lens as previously noted. Therefore, if the AF sensor ($F_{NO}$ small) is selected for focus detection, the focus detection can be done by correcting the difference ($\Delta SB_2 + \Delta IR_2$) between the photographic lens stop position $Q_2$ by AF and the best image position $P_0$. FIG. 5(b) shows such amount of correction for each AF mode and AF sensor used. Since these data of correction are peculiar value depending on AF sensor and photographic lens, they can be stored in a read-only memory (ROM) provided within the photographic lens, and read out at the time of focus detection.

The following is an explanation about the arrangement of a light sensing element for focus detection, etc. in a camera body.

FIG. 6 is a longitudinal sectional view showing the arrangement of an optical system of a camera, as well as a light emitting element and a light sensing element both for focus detection, in which numerals 1, 2, 3, 4, 5 and 6 denote a camera body, a photographic lens, a movable mirror, a pentagonal roof prism, a finder optical system, and an infrared ray emitting element for focus detection, respectively, and numerals 7a, 7b and 7c denote components of a projection optical system for focus detection. Further, numeral 8 denotes a mirror for conducting incident light to a light sensing element module 9. The reference mark F represents a predetermined focal plane of the photographic lens 2 and the mark L represents an optical bundle of an infrared ray radiated to an object from the infrared ray emitting element 6 for focus detection.

It is FIG. 7(a) and FIG. 7(b) that show in detail a construction of the light sensing element module 9 for focus detection. FIG. 7(a) is a cross sectional view of components of the said module and FIG. 7(b) is a front view showing a positional relation of the light sensing element composed of an aperture mask 205 and CCD line sensors.

In FIG. 7(a), the numeral 200 denotes a field mask disposed near the predetermined focal plane of the photographic lens, an elongated opening 200a being formed in the field mask 200 in a direction perpendicular to the surface of drawing. Numeral 201 denotes a colorless transparent cover disposed just behind the field mask 200a, and numeral 202 denotes a condenser lens which has a power capable of focusing later-described apertures 205a and 205b approximately onto an exit pupil of the photographic lens.

The numeral 203 denotes a total reflection mirror for deflecting the incident light which has passed through the condenser lens 202, in the direction of a beam splitter 204.

The beam splitter 204 has a half-mirror surface 204a and a total reflection surface 204b, and it splits the incident light into two optical bundles according to wavelength regions of the incident light so that the visible ray component used in the passive AF passes straight through the half-mirror surface 204a while the infrared ray component used in the TTL active AF is reflected by the half-mirror surface 204a and further reflected by the total reflection surface 204b.

Behind the beam splitter 204 is provided the aperture mask 205 in close contact with the beam splitter 204, which mask is formed with four apertures 205a and 205b of a generally elliptic shape as shown in FIG. 7(b).

The apertures 205a are for the passive AF, while the apertures 205b are for the TTL active AF, both being disposed in symmetric positions with respect to the optical axis of the photographic lens.

If the spacing of the each apertures 205a is 1 and that of the each apertures 205b is m, 1 and m are in the relation of 1<m. The module is constructed so that in the case of TTL active AF the incident light from larger height, namely, a portion of a smaller aperture value, of the photographic lens than in the passive AF is incident on the light sensing element. This is for preventing the incidence of disturbing light upon the light sensing element for focus detection in the TTL active AF.

Behind the apertures 205a is disposed a secondary focusing lens 206a, while behind the apertures 205b is disposed a secondary focusing lens 206b, and light sensing elements 100a and 100b for focus detection are disposed on an identical focal plane of the lenses 206a and 206b.

Figure 8A:
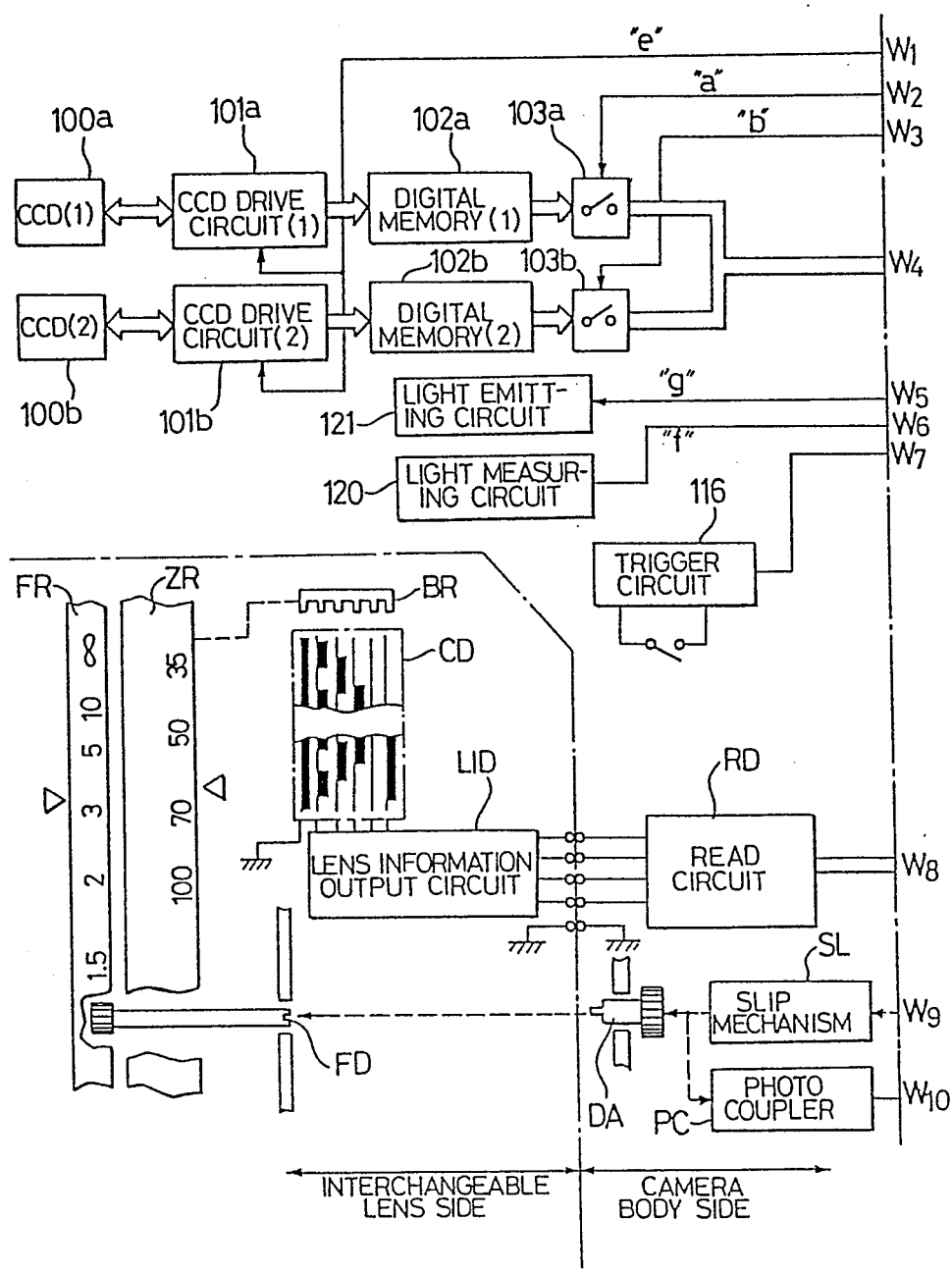
FIG. 8(a) and FIG. 8(b) are block diagrams showing a circuit of the focus detecting system according to a first embodiment of the present invention when combined each other.
Figure 8B:
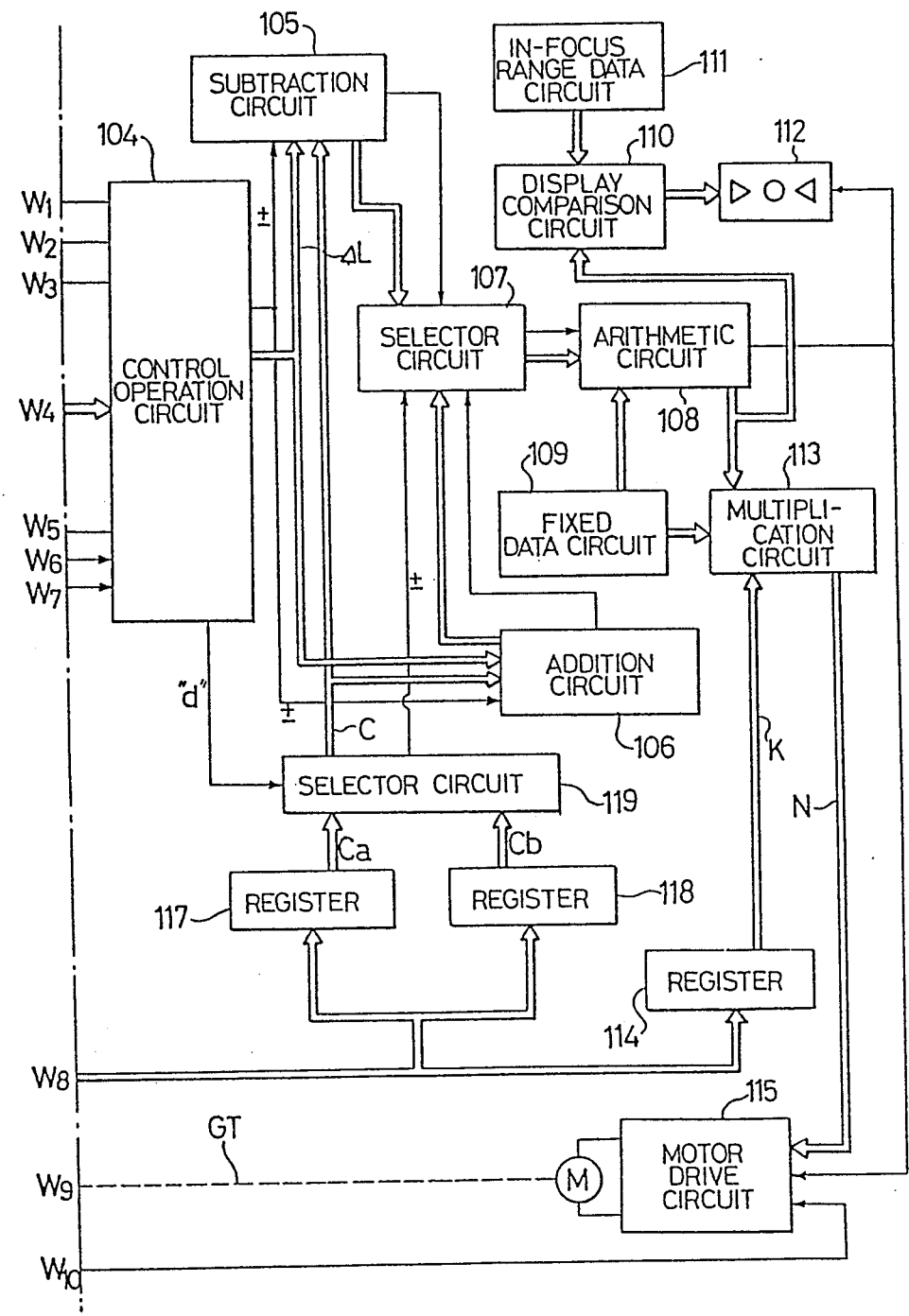

The following description is provided about a circuit of the focus detecting system of the invention with reference to the block diagram of FIG. 8(a) and FIG. 8(b) in combined form.

Explanation will first be made about a construction on the camera body side. Light sensing elements 100a and 100b for focus detection are each constituted by a one-dimensional line sensor such as CCD for example. The light sensing element 100a is for the passive AF which makes focus detection on the basis of an external light, while the light sensing element 100b is for the TTL active AF in which infrared light is projected through a photographic lens from behind the same lens and the light reflected from an object is detected by the light sensing element 100b through the same photographic lens to effect focus detection.

Light which has passed through the first apertures 205a is incident on the light sensing element 100a for passive AF, while light which has passed through the second apertures 205b is incident on the light sensing element 100b for TTL active AF.

Numerals 101a and 101b denote CCD drive circuits which not only convert analog detection signals provided from the light sensing elements 100a and 100b into digital detection signals and output the latter but also drive the light sensing elements 100a and 100b.

Numerals 102a and 102b denote digital memory circuits for temporarily storing the digital detection signals provided from the CCD drive circuits 101a and 101b, respectively.

Numerals 103a and 103b denote gate circuits which receive the output signals from the above digital memory circuits. When call signals transmitted by signal lines "a" and "b" from a control operation circuit 104 are in "H" level, the gate circuits 103a and 103b are enabled and output the data stored in the digital memory circuits 102a and 102b to the control operation circuit 104. The signal line "a" becomes "H" level in the passive AF, while the signal line "b" becomes "H" level in the TTL active AF, so the data stored in the digital memory circuit 102a is fed to the control operation circuit 104 in the passive AF, while the data stored in the digital memory circuit 102b is fed to the circuit 104 in the TTL active AF.

Numeral 105 denotes a subtraction circuit to which are fed the amount of defocus ΔL and defocus direction (positive or negative) from the control operation circuit 104 as well as correction data C on aberration (e.g. spherical aberration) of the photographic lens from a selector circuit 119 and in which the correction data C is subtracted from the amount of defocus ΔL and the result is output together with the symbol (positive or negative) of the defocus direction.

Numeral 106 denotes an addition circuit which is the same as the above subtraction circuit except that the addition of correction data is performed. In the addition circuit 106 the correction data C on aberration of the photographic lens is added to the amount of defocus ΔL which has been output from the control operation circuit, and the result is output together with the symbol (positive or negative) indicative of a defocus direction.

Numeral 107 denotes a selector circuit to which are applied output signals from the subtraction circuit 105 and addition circuit 106 as well as a positive or negative symbol signal of the correction data on aberration of the photographic lens provided from the selector circuit 119. If the symbol is negative, the selector circuit 107 selectively outputs the output signal of the subtraction circuit 105 and a positive or negative symbol signal, while when the input symbol signal is positive, the selector circuit 107 selectively outputs the output signal of the addition circuit 106 and a positive or negative symbol signal.

Numeral 108 denotes an arithmetic circuit to which are applied output signals from the selector circuit 107 and a fixed data circuit 109. This fixed data concerns a predetermined spacing from a reference position predecided between the camera body and the interchangeable lens. According to the input positive or negative symbol of the fixed data the arithmetic circuit 108 performs addition or subtraction with respect to the data fed from the selector circuit 107, calculates the amount ΔL' and direction of defocus from the reference position, and outputs the results to the display comparison circuit 110 and the multiplication circuit 113.

The display comparison circuit 110 compares the amount of defocus ΔL' with a signal provided from a circuit 111 which contains in-focus range data indicative of an allowable range of in-focus position, and outputs an in-focus or out-of-focus signal and a direction signal thereon.

Numeral 112 denotes a display circuit which receives the output signal from the display comparison circuit 110 and the defocus direction signal from the arithmetic circuit 108, and makes in-focus or out-of-focus display as well as a direction in the case of out-of-focus display.

The multiplication circuit 113 performs multiplication of defocus quantity ΔL' provided from the arithmetic circuit 108, a transformation coefficient K for focus adjustment stored in a register 114 and a transformation coefficient on reduction ratio of an interchangeable lens driving mechanism which coefficient is stored in the fixed data circuit 109, thereby calculating the number and direction of revolutions of a motor M necessary for the movement of lens. The transformation coefficients include information based on a focal length of the photographic lens and a mechanical construction of a lens moving system required for attaining a lens movement corresponding to the amount of defocus ΔL'.

Numeral 115 denotes a motor driving circuit, which controls the rotational direction and he number of revolutions of the motor M in accordance with output signals provided from the arithmetic circuit 108 and the multiplication circuit 113. The rotation of the motor M is transmitted to a lens driving shaft DA through a gear train GT and a slip mechanism SL. The rotational angle of the lens driving shaft DA is monitored by an encoder constituted by a photo coupler PC and is fed back to the motor driving circuit 115 to rotate the motor at a predetermined number of revolutions.

Numeral 116 denotes a trigger circuit, which produces a focus detecting operation start signal in accordance with the operation of a shutter button or the operation of a switch provided separately from the shutter button and provides it to the control operation circuit 104.

Numerals 117 and 118 denote registers which contain two kinds of correction data Ca and Cb on the aberration of the photographic lens read by a read circuit RD, Ca being correction data [$\Delta SB_1$ in FIG. 5(b)] in the passive AF and Cb being correction data ($\Delta SB_2 + \Delta IR_2$) in the TTL active AF.

The selector circuit 119 operates in accordance with a positive or negative call signal provided from the control operation circuit 104. If the call signal is a positive signal, the selector circuit 119 selects the correction data stored in the register 117, while if it is a negative signal, the circuit 119 selects the correction data stored in the register 118, and the circuit 119 provides the thus-selected correction data to the subtraction circuit 105 and addition circuit 106.

Reference will now be made to the construction on the interchangeable lens side. The left lower portion of FIG. 8(a) defined by chain line represents the construction on the interchangeable lens side, showing an example of zoom lens.

The reference mark ZR represents a zoom ring which is operated manually, with an integrally rotatable brush BR being attached thereto.

The reference mark CD represents a code plate. The code plate CD, which is provided at the lens barrel portion in opposed relation to the brush BR, generates a digital code signal corresponding to a set focal length in accordance with the rotation of the zoom ring ZR, namely, setting of focal length.

The reference mark LID represents a lens information output circuit, which incorporates therein a read-only memory (ROM) containing correction data Ca and Cb on the aberration of the photographic lens and also containing the motor revolution transformation coefficient K. With the digital code signal corresponding to the set focal length provided from the code plate CD as an address signal, the lens information output circuit LID reads the correction data Ca, Cb and the transformation coefficient K from the ROM and transmits them to the registers 117, 118 and 114 through the read circuit RD on the camera body side.

As to the correction data Ca and Cb on the aberration of the photographic lens, it goes without saying that values according to zooming operations of the photographic lens are successively read from the ROM and updated.

Between the camera body and the interchangeable lens are connected lines such as power source, clock signal, read signal and data signal lines as well as earth wire through connecting terminals. Further, there is provided a driven shaft FD coupled with the lens driving shaft DA on the camera body side, whereby a focusing ring FR is rotated.

The operation of this circuit will now be described. Upon mounting of an interchangeable lens on the camera body, the lens information output circuit LID and the read circuit RD are coupled through terminals, and the lens driving shaft DA and the driven shaft FD are also coupled together.

When the camera operator depresses the shutter button to focus the photographic lens, electric power is fed to the lens information output circuit LID, and correction data Ca and Cb on lens aberration as well as the motor revolution transformation coefficient K are read from the ROM in accordance with clock and read signals and stored in the registers 117, 118 and 114. The correction data and transformation coefficient thus stored in the registers are updated by data taking in and storing operations repeated at predetermined timings. Even if the focal length varies with the zooming operation of the lens, the corresponding newest data are stored.

Upon completion of the above data taking-in operation, CCD drive pulses are provided from the control operation circuit 104 to the CCD drive circuits 101a and 101b, which in turn provides CCD drive start signals to the focus detecting and light sensing elements 100a and 100b. Analog signals generated in the light sensing elements 100a and 100b are converted to digital signals by means of A-D converters provided in the CCD drive circuits 101a and 101b, which digital signals are stored in the digital memory circuits 102a and 102b.

On the other hand, a light measuring circuit 120 measures the luminance of an object and outputs the measured value to the control operation circuit 104, which in turn judges whether the measured value is lower than a predetermined level or not, and performs the following operation if the measured value is lower than the predetermined level. Upon start of integration of output signals provided from the light sensing elements 100a and 100b for focus detection, the control operation circuit 104 brings a signal line "g" into a state of "H" and provides a light emitting signal to a light emitting circuit 121 to turn ON the infrared ray emitting element 6 for focus detection (see FIG. 6), allowing the infrared ray from the infrared ray emitting element 6 to be directed to an object through a part of the photographic lens. Then, the signal lines "a" and "b" are brought into "L" and "H" conditions, respectively, to disable the gate circuit 103a and enable the gate circuit 103b, allowing the contents of the digital memory circuit 102b to be output to the control operation circuit 104. Further, the control operation circuit 104 produces a negative symbol signal to the selector circuit 119 to select and output the correction data Cb on aberration of the photographic lens stored in the register 118.

On the other hand, the following operations are performed when the measured luminance value is higher than the predetermined level. First, the signal line "g" is made "L" to turn OFF the light emitting circuit 121. Next, the signal lines "a" and "b" are rendered "H" and "L", respectively, to enable the gate circuit 103a and disable the gate circuit 103b, allowing the contents of the digital memory circuit 102a to be output to the control operation circuit 104. Further, a positive code signal is output to the selector circuit 119 to select and output the correction data Ca on aberration of the photographic lens stored in the register 117.

In the control operation circuit 104, the input data from the digital memory circuit 102a or 102b is subjected to an arithmetic processing in accordance with a predetermined algorithm, and there are output the amount of defocus $\Delta L$ and a defocus direction signal (positive or negative) at that time point on the basis of a phase difference of correlation signals on the light sensing elements 100a and 100b.

The subtraction circuit 105 and the addition circuit 106 execute operations for the amount of defocus ΔL and the correction data Ca and Cb on aberration of the photographic lens provided from the selector circuit 119, and output the results together with symbol signals.

In accordance with a positive or negative corrective direction signal provided from the selector circuit 119 the selector circuit 107 selects the output signal of the subtraction circuit 105 if the direction signal is a negative signal, or selects the output signal of the addition circuit 106 if the direction signal is a positive signal, and transfers the thus-selected signal to the arithmetic circuit 108.

The arithmetic circuit 108 adds the output from the selector circuit 107 and that from the fixed data circuit 109, provided some particular contents of fixed data may require subtraction. In any case, there is performed a certain addition (or subtraction) with respect to a reference point of the correction data Ca or Cb.

The output data of the arithmetic circuit 108 corresponds to the amount of defocus ΔL' detected by the focus detection optical system. It is compared with a predetermined in-focus range data by means of the display comparison circuit 110 and the result of the comparison, namely, in-focus or out-of-focus, is displayed by the display circuit 112.

In the multiplication circuit 113 there is performed a multiplication processing for the amount of defocus ΔL', the motor revolution transformation coefficient K stored in the register 114 and the transformation coefficient related such as reduction ratio of the gear mechanism stored in the fixed data circuit 109, and motor revolutions, as well as a rotational direction signal from the arithmetic circuit 108, are output to the motor driving circuit 115.

In accordance with the thus-input motor revolutions and rotational direction signal the motor driving circuit 115 drives the motor M and rotates the focusing ring FR of the photographic lens through the gear train GT, slip mechanism SL, driving shaft DA and driven shaft FD to move the photographic lens in the direction of its optical axis up to in-focus position. At this time, the rotation of the driving shaft DA is monitored by the encoder constituted by the photo coupler PC, and the drive circuit 115 is kept under feedback control to ensure an accurate rotation control.

Explanation of the first embodiment is now over. Although in this embodiment there are used two light sensing elements for focus detection, one for passive AF and the other for TTL active AF, there may be adopted a construction in which only one light sensing element is used in common and apertures are changed over electrically using an electro-optical element or mechanically.

As to the active AF, moreover, there is an external light type active AF in which a focus detecting light is radiated without passing through the photographic lens.

The following description is now provided about a focus detecting device including such external light type active AF as a second embodiment.

Figures 9A, 9B:
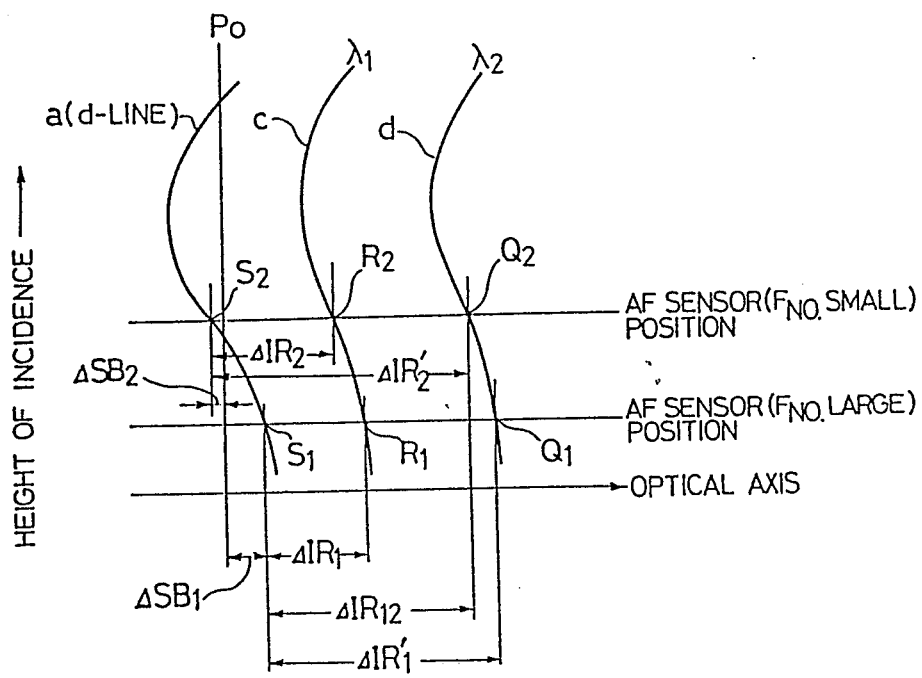
FIG. 9(a) and FIG. 9(b) are diagrams showing another example of aberrations of a photographic lens and amounts of correction.

FIGS. 9(a) and 9(b) correspond to the correction principle and correction amount previously shown in FIGS. 5(a) and 5(b).

A curve a represents a spherical aberration of a photographic lens against a visible ray of a wavelength $\lambda = 587$ mm (d-line); a curve c represents a spherical aberration thereof against an infrared ray of a wavelength $\lambda_1$ for active AF; and a curve d represents a spherical aberration thereof against an infrared ray of a wavelength $\lambda_2$ for TTL active AF.

$P_0$ represents the best image position on the optical axis in the case of visible ray (d-line); $S_1$ and $S_2$ represent stop positions of a photographic lens set by AF sensor ($F_{NO.}$ large) and AF sensor ($F_{NO.}$ small), respectively, in the case of passive AF.

Similarly, $R_1$ and $R_2$ represent stop positions of the photographic lens set by AF sensor ($F_{NO.}$ large) and AF sensor ($F_{NO.}$ small), respectively, in the case of active AF. Further, $Q_1$ and $Q_2$ represent stop positions of the photographic lens set by AF sensor ($F_{NO.}$ large) and AF sensor ($F_{NO.}$ small), respectively, in the case of TTL active AF.

When the passive AF is utilized for a relatively bright object, and in the case of a dark photographic lens having a large $F_{NO.}$, the photographic lens can be focused to the best image position by making focus detection using AF sensor ($F_{NO.}$ large) and making correction using an amount of correction $\Delta SB_1$, while in the case of bright photographic lens having a small $F_{NO.}$, the same purpose can be attained by using AF sensor ($F_{NO.}$ small) and using an amount of correction $\Delta SB_2$.

When the object is dark to the extent of permitting the use of a dedicated electronic flash unit, the active AF is utilized in which light is radiated from a focus detecting light emitter incorporated in the electronic flash unit. A suitable AF sensor is selected according to focal length and $F_{NO}$ of the photographic lens mounted on the camera body and correction is made using an amount of correction $\Delta SB_1 + \Delta IR_1$ or $\Delta SB_2 + \Delta IR_2$ as in the previous case.

Also in the case of using the TTL active AF, the photographic lens can be focused to the best image position by selecting a suitable AF sensor in consideration of focal length and $F_{NO}$ of the photographic lens as well as disturbing light beams which may occur in the case of TTL active AF and also by making correction using an amount of correction $\Delta SB_1 + \Delta IR_1'$ or $\Delta SB_2 + \Delta IR_2'$.

FIG. 9(b) shows the above amounts of correction for AF sensors in different types of AF modes.

Figure 10:
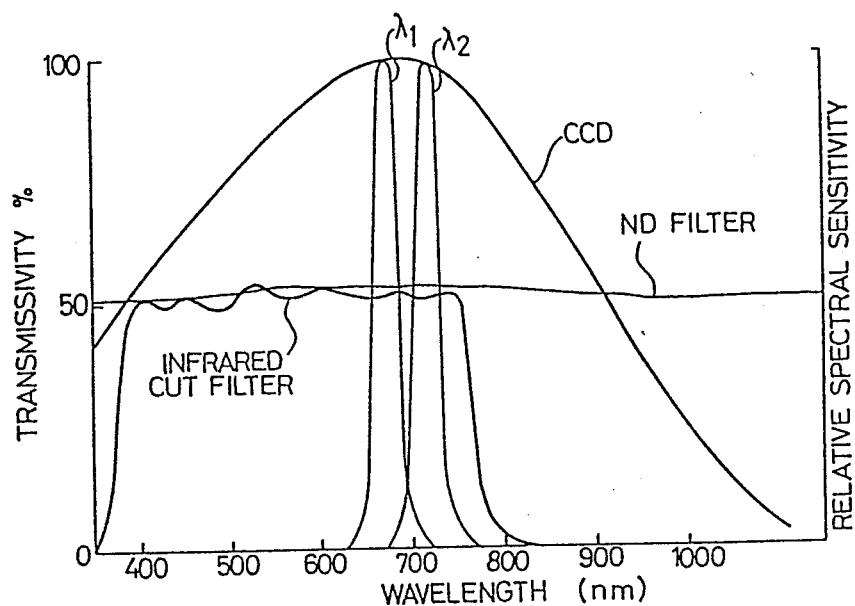
FIG. 10 is a diagram showing spectral characteristics of a focus detecting module.

FIG. 10 shows spectral sensitivity characteristics of radiated light (wavelength $\lambda_1$) in the external light type active AF and radiated light (wavelength $\lambda_2$) in the TTL active AF, in the case where the transparent cover 201 is an infrared cut filter and the half-mirror surface 204a of the beam splitter 204 is an approximately 50% transmissible ND filter, in the focus detecting module shown in FIG. 7. Although LED's of different light emitting characteristics are shown as light sources, there may be used LED's of just the same characteristics.

Figure 13A:
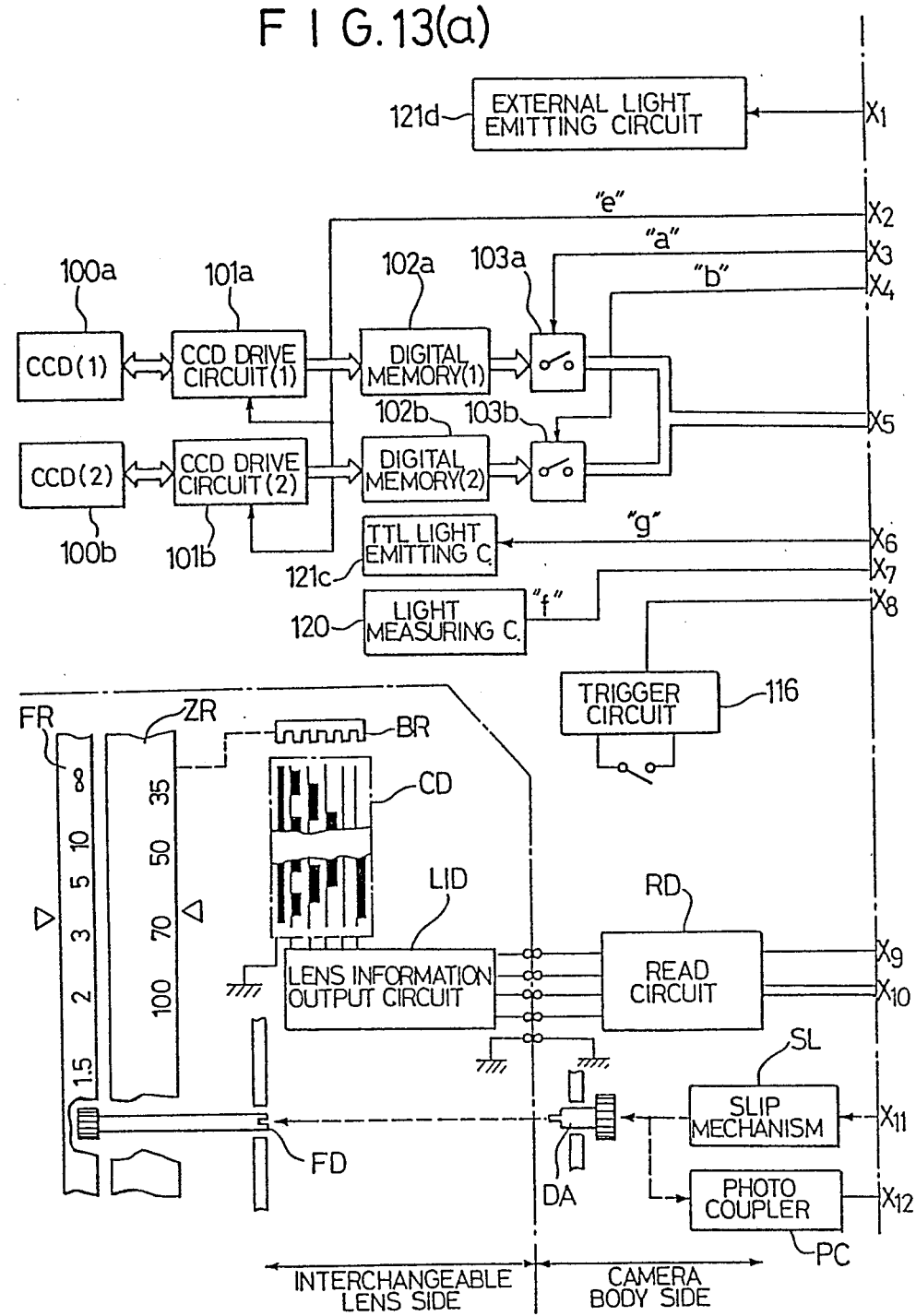
FIG. 13(a) and FIG. 13(b) are block diagrams showing a circuit of a focus detecting system according to a second embodiment of the present invention when combined each other.
Figure 13B:
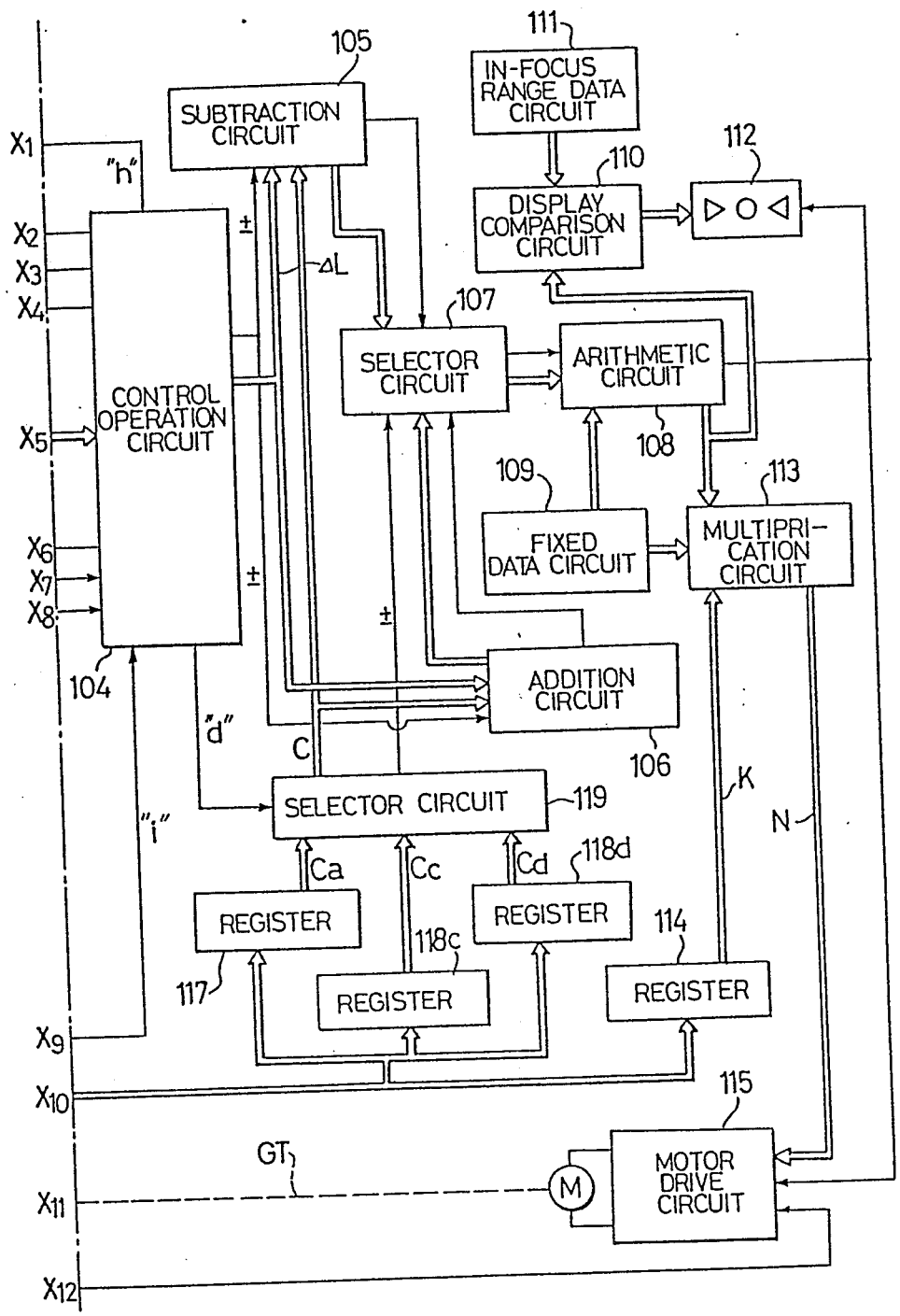

FIG. 13(a) and FIG. 13(b) are block diagrams showing a circuit of the focus detecting device having the above three AF modes in combined form.

This circuitry is similar in construction and operation to the circuitry shown in FIG. 8(a) and FIG. 8(b), so only different points will now be described. A constructional difference resides in the addition of a TTL light emitting circuit 121c for the TTL active AF, an external light emitting circuit 121d for the external light type active AF, registers 117, 118c and 118d for taking in correction data from the lens information output circuit, and a signal line "i" for inputting an open aperture value (minimum F-number) of a photographic lens to the control operation circuit 104.

Different points in operation caused by such difference in construction are as follows. An open aperture value of the photographic lens is input to the control operation circuit 104 from the lens information output circuit LID. And correction data Ca ($Ca_1=\Delta SB_1$, $Ca_2=\Delta SB_2$), Cc[$Cc_1=(\Delta SB_1+\Delta IR_1)$, $Cc_2=(\Delta SB_2+\Delta IR_2)$] and Cd[$Cd_1=\Delta SB_1+\Delta IR_1'$), $Cd_2=(\Delta SB_2+\Delta IR_2')$], which are peculiar to the photographic lens, are input to the registers 117, 118c and 118d from the lens information output circuit LID.

Where the measured luminance value obtained by the light measuring circuit 120 is lower than the predetermined value, the control operation circuit 104 provides a light emission signal to the external light emitting circuit 121d or the TTL light emitting circuit 121c to turn ON the light emitting device in accordance with a signal indicative of selection of either the external light type active AF or the TTL active AF.

The control operation circuit 104 judges whether the input open aperture value of the photographic lens is larger than a predetermined value or not, and if the open aperture value is larger, the control operation circuit 104 activates the gate circuit 103a and receives the output of the digital memory circuit 102a, while if the open aperture value is smaller, the control operation circuit activates the gate circuit 103b and receives the output of the digital memory circuit 102b.

Further, where the output of the light measuring circuit 120 is lower than the predetermined value and the TTL light emitting circuit is operated selectively, the control operation circuit 104 causes the selector 119 to select the correction data Cd stored in the register 118d, more specifically either $Cd_1$ or $Cd_2$, according to whether the open aperture value is larger than the predetermined value or not. Likewise, where the external light emitting circuit is selected and operated, the control operation circuit causes the selector 119 to select the correction data $Cc_1$ or $Cc_2$ stored in the register 118d. Where the output of the light measuring circuit 120 is higher than the predetermined value, the control operation circuit causes the selector 119 to select the correction data $Ca_1$ or $Ca_2$ stored in the register 117. The thus-selected correction data are output to the subtraction circuit 105 and the addition circuit 106.

Other constructional and operational points are the same as in the first embodiment illustrated in FIG. 8(a) and FIG. 8(b) and so explanation will be omitted.

Figure 11:
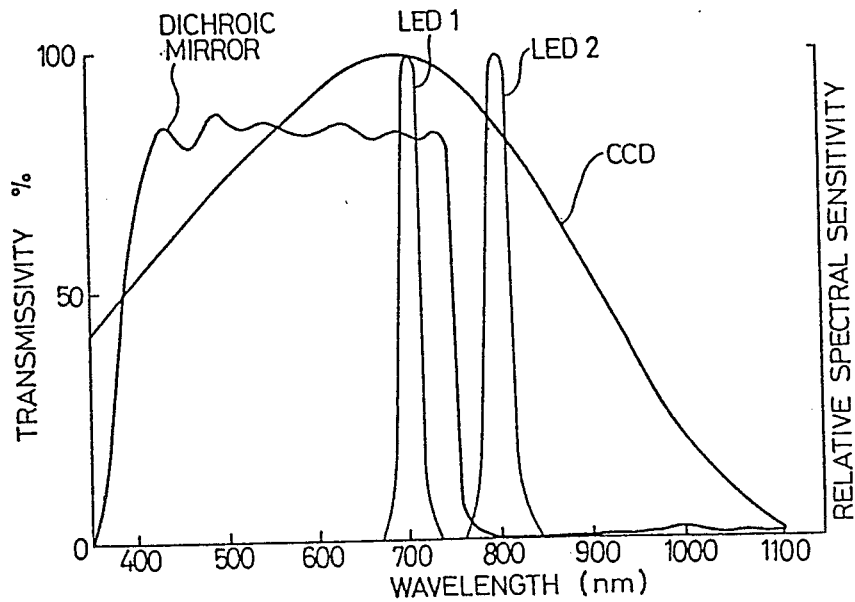
FIG. 11 is a diagram showing spectral characteristics of another focus detecting module.

FIG. 11 shows spectral characteristics obtained by using, in the focus detecting module of FIG. 7(a) and FIG. 7(b), a dichroic mirror as the half-mirror surface 204a of the beam splitter 204 and using the aperture 205a ($F_{NO.}$ large) and the light sensing element 100a in the cases of passive AF and external light type active AF, while using the aperture 205b ($F_{NO.}$ small) and the light sensing element 100b in the case of TTL active AF. $LED_1$ represents a spectral characteristic of a light source used in the external light type active AF, while $LED_2$ represents a spectral characteristic used in the TTL active AF.

It is FIG. 12 that shows amounts of correction for AF sensors in different types of AF modes. By using $\Delta SB_1+\Delta IR_{12}$ (see FIG. 9(a)) as the amount of correction in the TTL active AF, it becomes possible to calculate amounts of correction from the three parameters of $\Delta SB_1$, $\Delta IR_1$ and $\Delta IR_{12}$ with respect to the three AF modes.

According to the focus detecting system of the present embodiment, as set forth hereinabove, a plurality of focus detecting portions are provided and the most suitable focus detecting portion is selected according to whether the AF mode is the passive AF or the TTL active AF, making it possible to eliminate the influence of disturbing light caused by intersurface reflection of lens which is an obstacle to the TTL active AF. Besides, correction data on aberration of a photographic lens for apertures of the plural focus detecting portions are stored in the photographic lens and a focus detection signal is corrected using such correction data in the focus detecting operation to set the photographic lens in the best image position, thus permitting focus adjustment at a high accuracy for a variety of interchangeable lenses.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A focus detecting system for detecting a focusing condition of a photographic lens on a predetermined focal plane, comprising:

means for forming first and second pairs of secondary images of an image formed by the photographic lens on the predetermined focal plane;

means for limiting a light bundle which has passed through the secondary image forming means, said limiting means including a first pair of secondary images and a second pair of aperture masks corresponding to the second pair of secondary images, said first pair of the aperture masks being located closer than said second pair of aperture masks are located with respect to an optical axis of the photographic lens;

means for detecting light intensity distributions of the first and second pairs of secondary images, said light intensity distribution detecting means including a first pair of light receiving elements disposed for receiving the first pair of secondary images and a second pair of light receiving elements disposed for receiving the second pair of secondary images;

means for storing first and second kinds of correction data determined in accordance with spherical aberration generated by the photographic lens, said first kind of correction data corresponding to the first pair of aperture masks while the second second kind of correction data corresponds to the second pair of aperture masks;

means for selecting either of a first combination composed of the first pair of light receiving elements and the first kind of correction data and a second combination composed of the second pair of light receiving elements and the second kind of correction data, and means for detecting the focusing condition of the photographic lens in accordance with an output of the selected pair of light receiving elements and the selected kind of correction data.

2. A focus detecting system as claimed in claim 1, wherein the focusing condition detecting means includes means for calculating the focusing condition of the photographic lens in accordance with the output of the selected pair of light receiving elements, and means for correcting the calculated focusing condition in accordance with the selected kind of correction data to obtain a resultant focusing condition.

3. A focus detecting system as claimed in claim 1, further comprising means for controlling the selecting means to select either of the first and second combinations in accordance with a specific type of photographic lens.

4. A focus detecting system as claimed in claim 1, further comprising means for controlling the selecting means to select either of the first and second combinations in accordance with a predetermined condition of a specific photographic lens.

5. A focus detecting system as claimed in claim 1, wherein the first kind of correction data is determined in accordance with a best image position of the photographic lens and a position determined by the spherical aberration corresponding to a position of the first aperture mask, and the second kind of correction data is determined in accordance with the best image position and a position determined by the spherical aberration corresponding to a position of the second aperture mask.

6. A focus detecting system for detecting a focusing condition of a photographic lens on a predetermined focal plane, comprising:
   means for forming first and second pairs of secondary images of an image formed by the photographic lens on the predetermined focal plane;
   means for limiting a light bundle which has passed through the secondary image forming means, said limiting means including a first pair of aperture masks corresponding to the first pair of secondary images and a second pair of aperture masks corresponding to the second pair of secondary images, said first pair of aperture masks being located closer with respect to an optical axis of the photographic lens than said second pair of aperture masks are located;
   means for detecting light intensity distributions of the first and second pairs of secondary images, said light intensity distribution detecting means including a first pair of light receiving elements disposed for receiving the first pair of secondary images and a second pair of light receiving elements disposed for receiving the second pair of secondary images;
   means for projecting infrared light onto an object to be focused for illuminating the object;
   means for storing first and second kinds of correction data, said first kind of correction data being determined in accordance with a first difference between a best image position of the photographic lens for visible light and a first position, said first position being predetermined on the basis of both the spherical aberration of the photographic lens for the infrared light projected by the projecting means and the positions f the first pair of aperture masks, said second kind of correction data being determined in accordance with a second difference between the best image position and a second position, said second position being predetermined on the basis of both the spherical aberration of the photographic lens for the infrared light projected by the projecting means and the positions of the second pair of aperture masks;
   means for selecting either of a first combination composed of a first pair of light receiving elements and the first kind of correction data and a second combination composed of a second pair of light receiving elements and the second kind of correction data, and
   means for detecting the focusing condition of the photographic lens in accordance with an output of the selected pair of light receiving elements and the selected kind of correction data.

7. A focus detecting system as claimed i claim 6, further comprising means for controlling the selecting means to select either the first and second combinations in accordance with at least either the specific type of the photographic lens or a predetermined condition of the photographic lens.

8. A focus detecting system as claimed in claim 6, wherein the focusing condition detecting means includes means for calculating the focusing condition of the photographic lens in accordance with the output of the selected pair of light receiving elements, and means for correcting the calculated focusing condition in accordance with the selected kind of correction data.

9. A focus detecting system as claimed in claim 6, wherein the first difference is determined in accordance with both a first visible difference between the best image position and a third position predetermined on the basis of both spherical aberration of the photographic lens for visible light and the positions of the first pair of aperture masks, and a first infrared difference between the first and third positions, and wherein the second difference is determined in accordance with both a fourth position predetermined on the basis of both the spherical aberration of the photographic lens for visible light and the positions of the second pair of aperture masks, and a second infrared difference between the second and fourth positions.

10. A focus detecting system as claimed in claim 9, further comprising means for emitting light towards the object without being transmitted through the photographic lens.

11. A focus detecting system as claimed in claim 9, further comprising means for emitting light towards the object through the photographic lens.

12. A focus detecting system as claimed in claim 11, wherein the light emitted by the light emitting means having a predetermined wavelength range which is different from a wavelength range of the infrared light projected by the projecting means.

* * * * *